United States Patent
Sisler

[11] 3,706,304
[45] Dec. 19, 1972

[54] OPTICAL OPHTHALMODYNAMOMETER

[72] Inventor: Hampson A. Sisler, 77 7th Ave., Penthouse H, New York, N.Y. 10011

[22] Filed: Feb. 19, 1970

[21] Appl. No.: 12,604

[52] U.S. Cl. ............... 128/2 T, 73/80, 128/2.05 N, 351/6
[51] Int. Cl. ........................ A61b 3/00, A61b 5/02
[58] Field of Search ..... 128/2 T, 2 R, 2.05 N, 2.05 R, 128/2.05 P; 73/80; 351/6

[56] References Cited

UNITED STATES PATENTS

| | | | |
|---|---|---|---|
| 3,452,589 | 7/1969 | Hargens et al. | 73/80 |
| 3,446,061 | 5/1969 | Draeger et al. | 73/80 |
| 3,301,131 | 1/1967 | Benford | 73/80 X |
| 3,470,736 | 10/1969 | Bartfan | 73/80 |
| 2,780,221 | 2/1957 | Posner | 128/2 T |
| 2,430,851 | 11/1947 | Allen | 128/2 T UX |
| 2,622,473 | 12/1952 | Littmann | 128/2 T UX |
| 2,999,422 | 9/1961 | Papritz | 128/2 T UX |
| 3,290,927 | 12/1966 | Gambs | 73/80 |

FOREIGN PATENTS OR APPLICATIONS

| | | | |
|---|---|---|---|
| 862,920 | 3/1961 | Great Britain | 73/80 |
| 2,003,525 | 11/1969 | France | 128/2 T |

OTHER PUBLICATIONS erkins E. S., Transactions of the pthalmological Society of the United Kingdom, Vol. 73, 1953, pp. 261–266.
isler, H. A., mer. ourn. of pthalmology, Vol. 50, ept. 1960, pp. 419–424.

*Primary Examiner*—Kyle L. Howell
*Attorney*—Wilford L. Wisner

[57] ABSTRACT

The disclosed ophthalmodynamometer, an instrument for measuring the dynamic opthalmic artery blood pressure, is herein called an optical ophthalmodynamometer because it provides coincident axes of pressure application and visual observation of the characteristic arterial pulsations at measurement of systole and diastole. This instrument is advantageously and readily adapted as an additional attachment for the versatile slit lamp, which is a basic instrument used for eye examination and does not require an assistant for the examiner. The pressure is applied through a fundus lens mounted in a hollow cylindrical member, the axis of which is the axis of observation and through which illumination can be supplied and received paraxially without interferring with the observation. The diameter of the fundus lens is selected to be in the range from about 6 millimeters to about 10 millimeters.

5 Claims, 5 Drawing Figures

PATENTED DEC 19 1972 3,706,304

INVENTOR
H.A. SISLER
BY
Wilford L. Wiser
ATTORNEY

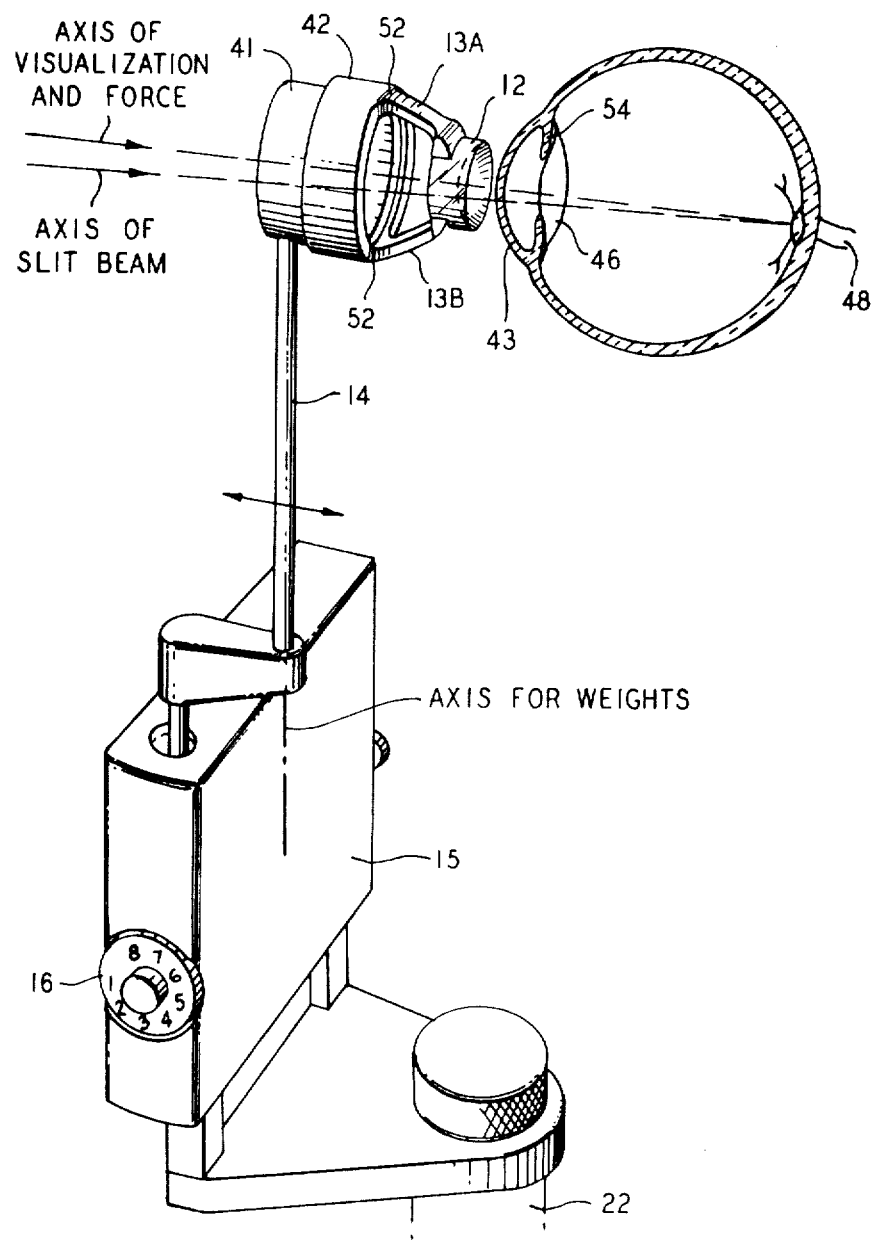

OPTICAL OPHTHALMODYNAMOMETER

BACKGROUND OF THE INVENTION

This invention relates to ophthalmodynamometers.

An ophthalmodynamometer is an instrument for applying a variable calibrated force over a known area of the eye to induce systole, pulsations at the peak of the blood pressure cycle, and diastole, pulsations at the minimum of the blood pressure cycle, of the central retinal artery. In the ophthalmodynamometer the intraocular pressure is artificially elevated by means of mechanically-applied pressure or suction. A separate apparatus is then employed to observe or detect the pulsations.

Typically, in the past, these pulsations have been observed visually by means of a hand-held instrument called an ophthalmoscope or sensed crudely by mechanical or fluid linkages from an inflated cuff around the head, to a manometer, which records pulsations resulting from fluctuations in the circulating blood pressure in that area of the body during the cardiac cycle. The essential function of the ophthalmoscope is to focus the fundus of the eye through the pupil of the eye and provide illumination through the pupil so that the examiner may view the fundus structures. The ophthalmoscope typically has several lenses of which one is selected and used to compensate the combined refractive errors of examiner and patient so that the fundus may be viewed from the focal point of the eye, about 17 millimeters in front of the cornea, with the aid of a source of paraxial light. Paraxial light is light the rays of which propagate at small angles to the viewing axis. In the use of the ophthalmoscope, the viewing distance is restricted because the light rays emerging from the eye are converging.

In measuring ophthalmic artery pressure by means of ophthalmodynamometry, the ophthalmologist can be of great assistance to the neurologist or neurosurgeon, for example, in diagnosing the location of vascular blockage involved in stroke. Such measurements represent the simplest means — and the only clinical means — of diagnosing (1) increased intracranial pressure (without doing a spinal tap), (2) carotid artery blockage — partial or complete (without doing an x-ray arteriogram) — and (3) carotid vascular blockage (correctable via neurosurgery) as the cause of overt or impending stroke.

There are two basic techniques — compression and suction — of ophthalmodynamometry, both of which yield artificially increased pressure readings in practice. Moreover, the artificial increase or inaccuracy of the pressure measurement is nonlinearly related to the actual pressure levels, so that it is difficult to correct by calculations. Further, many of the inaccuracies relate to conditions of the test which cannot be carefully controlled. For example, in the compression technique, which I prefer for the purposes of my invention, the axis of pressure application is rarely precisely radial. Non-radial components of pressure not only artificially increase the measured pressures, but also can cause slippage on the surface of the eye and consequent discomfort to the patient.

In both compression and suction techniques there is a distortion of the globe of the eye. This distortion tends to raise the internal pressure of the relatively incompressible vitreous fluid in it. The change in vitreous fluid pressure is, in turn, exerted against the central retinal area. In the suction technique, a leakage of air tends to occur along the periphery of the suction cup as the surface of the eye is distorted by being sucked into it, providing a source of error. Also, in suction techniques, partial collapse of the pneumatic tube results in loss of transmitted suction, causing additional errors. Because of the greater reliability of the compression technique, I prefer it to the suction technique.

Consequently, the central problems to which my invention is addressed are the avoidance of non-radial components of pressure, (aberrant vectors of applied force), and the simplification of the manipulations involved in pressure application and blood vessel observation in the compression technique of ophthalmodynamometry. By solving these problems, I wish to bring about greater accuracy than has been possible before, together with greater ease of measurement.

SUMMARY OF THE INVENTION

According to my invention, improved compression ophthalmodynamometry is obtained by employing optical compression ophthalmodynamometry, specifically with coincident axes of pressure application and visual observation directly along the visual axis of the eye. In principle, if the posterior pole of the fundus can be observed through my optical ophthalmodynamometer, then the axis of observation is inherently substantially radial to the surface of the eye. Consequently, so then is the axis of pressure application, whereby the inaccuracies of the systolic and diastolic reading are substantially reduced.

In a specific embodiment of my invention, the pressure is applied through a fundus lens mounted in a hollow, cylindrical member through which illumination can be supplied and received. The hollow, cylindrical member rides on a pressure application arm pivoted at, or translatable parallel to, a stable reference plane by suitable driving members such as springs or weights. The driving members are coupled to a calibrated scale or indicator.

A fundus lens is a type of contact lens that is applied directly to the front surface of the anesthetized cornea, with a viscous wetting agent of approximately the same index of refraction as the cornea and the fundus lens. With the aid of a paraxial source of light, it causes the light emerging from the eye to be parallel rather than converging, so that the fundus arteries and other structure can be observed from any convenient distance, typically with the aid of a microscope.

According to a further, more specific feature of my invention, my optical ophthalmodynamometer is mounted on a basic slit lamp, which then provides the stable reference plane, the paraxial illumination to be supplied through the hollow, cylindrical member, and magnification, typically with a biomicroscope. To implement this feature, the fundus lens is provided with a diameter just large enough, first, to admit sufficient paraxial light from the slit lamp and, second, to enable the examiner to position his eye or the slit lamp microscope on the optical axis of the fundus lens without obstruction on account of the light source. Nevertheless, in order to avoid the need for unreasonably large total forces which would depress the eye in its socket and thereby disturb the arterial pressure being measured or cause the head to move, particularly in the case of an unconscious patient, the fundus lens should be as small as possible. To satisfy these criteria, the diameter of the fundus lens in my optical ophthalmodynamometer preferably lies in the range from about 6 millimeters to about 10 millimeters.

More specifically, I prefer the diameter of the fundus lens to be in the range from 7.5 millimeters to 8.5 millimeters in order to supply optimally the foregoing desired qualities.

Preferably, the contact assembly of the fundus lens and the hollow cylindrical member should have a smooth exterior surface to avoid the pushing-away caused by a blink of the eyelids.

My ophthalmodynamometer should not be confined to use in conjunction with the table model slit lamp, but should also apply to any portable or hand-held slit lamp device, of which there are several in existence. Such a portable slit lamp would make "postural ophthalmodynamometry" possible with my ophthalmodynamometer. It would also make the procedure possible on unconscious patients in the recumbent position.

Postural ophthalmodynamometry is the measurement of intraocular pressure in three positions: standing, sitting and lying down. It is typically done to establish the presence or absence of abnormality in a doubtful case.

BRIEF DESCRIPTION OF THE DRAWINGS

Further features and advantages of my invention will become apparent from the following detailed description, taken together with the drawings, in which:

FIG. 2 is a more detailed pictorial illustration of the optical ophthalmodynamometer embodiment of FIG. 1, and also shows a sagittal section of the eye;

DESCRIPTION OF ILLUSTRATIVE EMBODIMENTS

Figure 1:
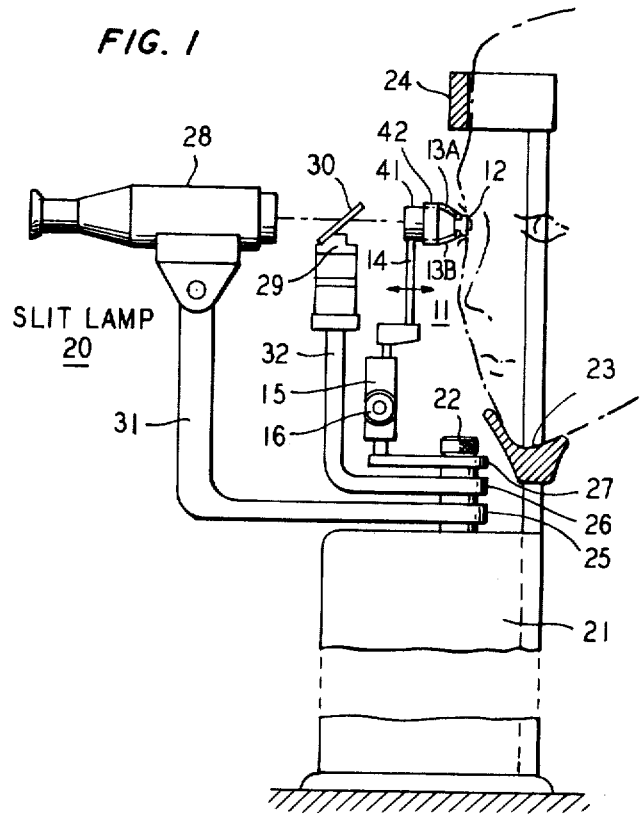
FIG. 1 is a pictorial illustration of an embodiment of the invention mounted on a table-model slit lamp.

The embodiment of FIG. 1 shows the relationship of my optical ophthalmodynamometer to its preferred mounting on an ophthalmologist's table-model slit lamp, which provides stability, illumination and suitable occulars or a microscope to be used by the examiner during the examination.

My optical ophthalmodynamometer 11 includes the fundus lens 12, upper and lower support arms 13A and 13B, pressure application arm 14 coupled to the support arms through cylinder 41, as may be more clearly seen in subsequent figures. It also includes spring loading mechanism 15 and spring force dial 16.

The slit lamp 20 on which ophthalmodynamometer 11 is mounted is a table-model slit lamp and includes the stable base 21, mounting post 22, chin rest 23 for the examinee's chin, headrest 24 for the examinee's forehead, the rotatable collar 25 on mounting post 22, and its extended arm 31 which supports the examining oculars 28 or a suitable examining microscope. It is noted that the examinee is the person or patient being examined.

The slit lamp 20 further includes the rotatable collar 26 on mounting post 22, its extended arm 32 which supports the slit-type light source 29 and its associated reflector 30, the rotatable collar 27, and its extended arm 33 which supports my optical ophthalmodynamometer 11.

The important fact to note in FIG. 1 with respect to the relationship of my optical ophthalmodynamometer 11 to its supporting apparatus, slit lamp 20, is that fundus lens 12 and support arms 13A and 13B may be positioned for radial application of pressure to the cornea of the patient's eye along the visual axis and that the optical axis of the examining oculars 28 or microscope can be aligned with the axis of cylinder 41, hollow mounting neck 42 and fundus lens 12. These have the same axis — the visual axis. It should also be noted that the visual axis can be bent upward within oculars 28 by prisms to allow a more comfortable position for the examiner.

Also, it should be noted that slit-type light source 29 and reflector 30 can be positioned within a horizontal plane to avoid blocking oculars 28 while simultaneously providing illumination arbitrarily close, or paraxially, to the visual axis. In other words, the axis of illumination makes a very small angle with the common axis of viewing and of pressure application. Consequently, fundus lens 12 is provided with a diameter adequate to permit sufficient paraxial illumination without blocking visual observation through the oculars 28, so that the illuminating beam passes through the central portion of fundus lens 12, through the pupil of the eye, and back into the fundus of the eye.

For the foregoing purpose, fundus lens has a diameter at least as large as 3 millimeters and preferably at least as large as 6 millimeters. To obtain sufficient applied pressure without large, severely distorting forces on the eye, the area of contact should be kept as small as feasible. Therefore, the fundus lens 12 has a diameter not more than 14 millimeters and preferably not more than 10 millimeters. Even more specifically, the diameter lies in the range from 7.5 to 8.5 millimeters. It should be noted that these dimensions are more important in the horizontal plane than in the vertical plane because the axis of the beam from light source 29 can be varied in the horizontal plane.

It should, of course, be understood that a floor-model or table-model slit lamp 20 is not essential to the use of my invention. To obtain the retinal arterial systolic and diastolic pressures of a person unconscious from stroke or other cause, alternative means for supporting the optical ophthalmodynamometer and for magnifying its image can be provided.

In either case, my invention has the substantial advantage that, once the proper viewing axis is found so that arterial pulsation can be observed, the application of pressure is radial to the eyes, as desired for accurate readings.

Alternative means for paraxial illumination and magnification for use in the recumbent position are possible with any small hand-held slit lamp type of device.

In the operation of the embodiment of FIG. 1, the head of the examinee is supported by chin rest 23 and headrest 24. Spring force dial 16 is turned toward increased settings (values) to actuate pressure application arm 14 by the force of springs in loading mechanism 15. Arm 14 moves toward the examinee and in turn moves support arms 13A and 13B and fundus lens 12 toward the cornea of the examinee's eye, to indent the latter. The increased vitreous fluid pressure produced as the fundus lens 12 presses radially upon the cornea (see FIG. 2) resists the motion and establishes an equilibrium such that substantially all of the pressure (force per unit area) applied radially to the cornea is transmitted to the retinal arteries.

At measurement of diastole, as the applied pressure increases, characteristic collapse of the retinal artery occurs only at the low point in the blood pressure cycle. At measurement of systole, as pressure is further increased, characteristic rapid pulsation of the artery is observed to yield to sustained collapse, even at the peak of the blood pressure cycle. The corresponding readings of dial 16 are converted to blood pressure readings according to a previously determined calibration.

The structure of my optical ophthalmodynamometer may be seen in more detail in FIG. 2.

Parts already indicated in FIG. 1 are numbered identically in FIG. 2. The assembly of the components 41, 14, 15 and 16 may be an adaptation of the well-known Goldmann applanation tonometer for a higher range of applied force as needed for blood pressure measurement.

Support arms 13A and 13B are rigidly attached to, or integrally formed with, a mounting neck 42, which fits over a support ring or cylinder 41 of pressure application arm 14. The inner diameter of neck 42 at the junction 52 with arms 13A and 13B is substantially larger than the lens diameter. Preferably, also, cylinder 41 is annular or filled with transparent material throughout an internal region of diameter larger than the diameter of fundus lens 12.

Hollow mounting neck 42 and support arms 13A and 13B are made of any rigid substance, illustratively aluminum, but also optionally plastic or ceramic. Fundus lens 12 is illustratively made of transparent plastic shaped to be supported by the ends of support arms 13A and 13B via its upper and lower lens mounting platforms 51A and 51B. These platforms reduce the effective lens diameter slightly in the relatively noncritical vertical plane. It has a concave outer surface (concavity toward the examinee) approximately matching the curvature of the cornea of the eye, although it could also be flat. The vitreous fluid pressure can be effectively raised in either manner. In either case, the curvature of the back surface of fundus lens 12, remote from cornea 43, is usually flat. The plastic employed in lens 12 is of index selected to provide a lens power which is the negative of the lens power of the eye as a total refracting body. I have employed, in models, a plastic that is similar to that commonly in contact lenses or in the Goldmann fundus lens.

Thus, lens 12 cancels, or compensates for, the focusing power of the eye as a whole, so that the fundus, that is, the back wall of the eye in the vicinity of the central retinal artery 47, can be observed.

Also indicated in FIG. 2 is an axis of application for additional weights at the end of a lever arm, when and if they are needed because of excessive elevation of the examinee's ophthalmic artery pressure.

Figure 3A:
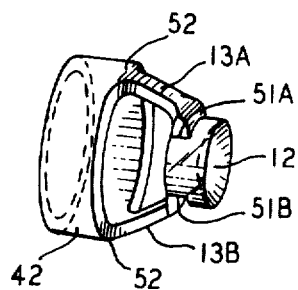
FIG. 3A is a perspective view of the contact assembly of the optical ophthalmodynamometer of FIGS. 1 and 2.
Figure 3B:
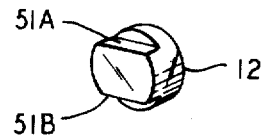
FIG. 3B is a perspective view of the fundus lens as adapted for the contact assembly.
Figure 3C:
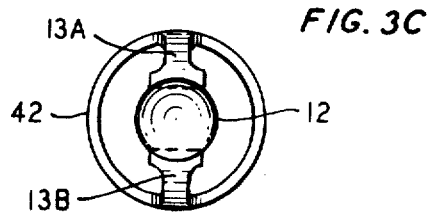
FIG. 3C is a frontal view of the contact assembly.

Further optional structural details are shown in FIGS. 3A – 3C.

Fundus lens 12, whether of clear plastic or of any other suitable transparent refractile substance, has recessed upper and lower lens mounting platforms 51A and 51B near its back surface and displaced from its concave surface. The ends of support arms 13A and 13B engage platforms 51A and 51B; and a fused interface may be formed between them.

The ends of support arms 13A and 13B near lens 12 are smooth and continuous, so that they tend to avoid being pushed away from the eye when an eyelid is blinked or pressed down on them. Moreover, their recessed positions on platforms 51A and 51B aid in this respect. Upper and lower support arms 13A and 13B thus prevent normal blinking from displacing the instrument and stopping the test; yet the eyelid is not permitted to close over lens 12.

The openings between support arms 13A and 13B are also advantageous in that they facilitate cleaning of the back surface of lens 12.

The embodiment of the invention, when applied to a portable, hand-held slit-lamp type of device, is particularly useful with stroke victims, unconscious emergency patients, and others unable to sit in proper position for examination with the conventional table or floor model slit lamp apparatus. The instrument, including its pressure-applying mechanism and hand-maneuverable paraxial light source and magnifier of the image, may be hand-held by a single operator, provided only that the examinee's face is employed to provide a stable reference for the motion of the contact assembly of FIG. 3. For example, this stable reference could be facilitated by a light, portable headrest and chin-rest frame (not shown) as an integral part of the hand-held apparatus.

Typically, a corneal local anesthetic would be employed to perform measurements on a conscious patient with such a portable apparatus.

I claim:

1. An instrument comprising an optical ophthalmodynamometer including a fundus lens which is at least partially transmissive to light, supporting structure for the lens, the support structure constructed and arranged to allow the passage of illuminating rays along a central portion of the lens when it is placed in the path of illumination, the lens being so constructed along a front face as to allow substantially coincident registry between at least its said central portion and the line-of-sight of an eyeball to be tested, pressure generating means arranged for applying an increasing pressure through said lens to said eyeball, said pressure generating means interconnected to said support structure, there being adjusting means operatively associated with the pressure generating means capable of increasing and decreasing said pressure, there being additional means associated with the instrument arranged to maintain a selected pressure at a relatively lower level for a time sufficient to allow determination of diastole from indicator means, said additional means also arranged to maintain a selected relatively higher pressure a sufficient time to allow determination of systole from said indicator means, there further being indicator means associated with the instrument having indicia indicative of the pressure being applied to the eyeball through the lens whereby said ophthalmodynamometer is arranged to indicate the pressure being applied during diastole and systole of a patient whereby one may determine collapse of the retinal artery at the low point in the blood pressure cycle of a patient being examined as well as the rapid pulsation and then sustained collapse of such an artery at the peak of the blood pressure cycle as pressure is increased, said instrument constructed and arranged for operative interconnection with an illuminating source, and an ocular device for respectively illuminating a retinal artery of said eyeball through said lens while allowing visual examination of said eyeball artery.

2. An instrument according to claim 1 including an illumination means comprising a slit lamp and an ocular means comprising an examination microscope on an optical axis substantially common with that of the axis of said eyeball being examined.

3. The instrument of claim 1 in which the lens, along the illumination path, is a plano-thick-concave lens retained in a tubular support structure and in which the line-of-sight of an eyeball being examined is parallel to the axis of said tubular member.

4. An instrument according to claim 3 in which said lens has a cross-section dimension normal to its longitudinal axis in the range of 6 to 10 millimeters.

5. The instrument of claim 3 in which the lens has partially opaque side walls, said side walls extending substantially parallel to its geometrical axis.

* * * * *

U.S. DEPARTMENT OF COMMERCE

PATENT OFFICE

Washington, D.C. 20231

UNITED STATES PATENT OFFICE
CERTIFICATE OF CORRECTION

Patent No. 3,406,315                                            October 15, 1968

Julius J. Muray

It is certified that error appears in the above identified patent and that said Letters Patent are hereby corrected as shown below:

Column 1, line 62, "fact-to-face" should read -- face-to-face --. Column 3, lines 74 and 75, "ond pair being spaced a fixed distance apart between wire electrode, the electrode elements of said sec-" should read -- wire electrode, the electrode elements of said second pair being spaced a fixed distance apart between --.

Signed and sealed this 3rd day of March 1970.

(SEAL)
Attest:

Edward M. Fletcher, Jr.                        WILLIAM E. SCHUYLER, JR.
Attesting Officer                                        Commissioner of Patents